No. 720,807. PATENTED FEB. 17, 1903.
H. G. HORN.
CORN THINNER.
APPLICATION FILED AUG. 27, 1902.
NO MODEL.
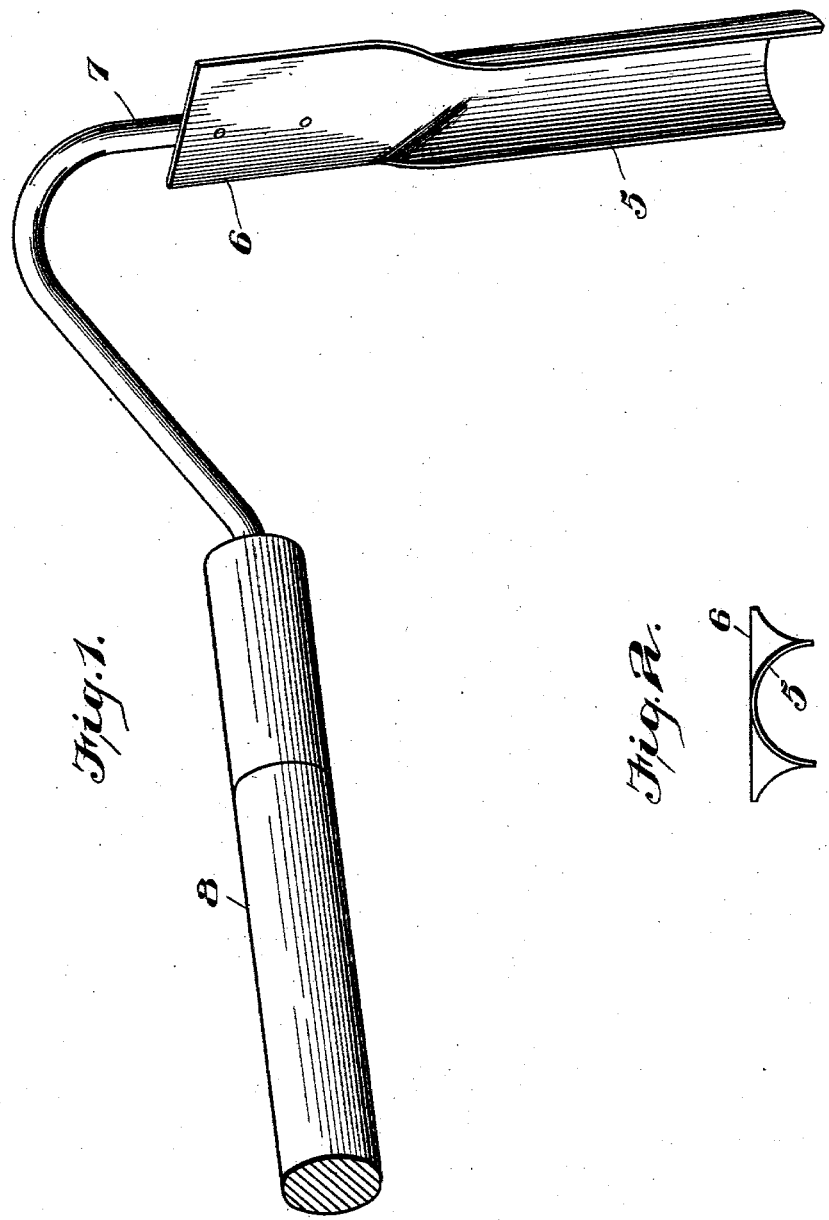
Witnesses
Inventor
H. G. Horn,

UNITED STATES PATENT OFFICE.

HENRY G. HORN, OF SPURGER, TEXAS.

CORN-THINNER.

SPECIFICATION forming part of Letters Patent No. 720,807, dated February 17, 1903.

Application filed August 27, 1902. Serial No. 121,184. (No model.)

*To all whom it may concern:*

Be it known that I, HENRY G. HORN, a citizen of the United States, residing at Spurger, in the county of Tyler, State of Texas, have invented certain new and useful Improvements in Corn-Thinners; and I do hereby declare the following to be a full, clear, and exact description of the invention, such as will enable others skilled in the art to which it appertains to make and use the same.

This invention relates to instruments for thinning corn; and it has for its object to provide an implement in the nature of a hoe, by means of which the excess stalks may be removed without requiring the operator to stoop over, whereby the thinning operation may be performed with a degree of ease and comfort.

In the drawings forming a portion of this specification, and in which like numerals of reference indicate similar parts in both views, Figure 1 is a perspective view showing the implement having a portion of its handle broken away. Fig. 2 is a bottom edge view of the blade of the tool.

Referring now to the drawings, the present tool comprises a blade, a shank, and a handle. The blade of the tool is formed of a rectangular sheet of metal, preferably steel, which at its upper end portion is flat, while substantially the lower two-thirds thereof is bent transversely into semicircular form, the side edges of the flat portion of the blade projecting laterally beyond the sides of the curved portions.

To the flat portion of the blade of the implement (shown at 6) is riveted a gooseneck 7, which is engaged in the end of a handle 8 in the usual manner, the lower edge of the curved portion 5 of the blade being utilized in the thinning operation. In the thinning operation the curved portion of the blade is pressed downwardly in the earth around the stalk, after which the implement is given a twist and a pull and the stalk is drawn from the ground. The fact that the flat portion of the blade projects beyond the curved portion permits of the use of the flat portion for the breaking of clods and other purposes, such as the chopping of weeds.

What is claimed is—

1. An implement for thinning corn comprising a blade having its upper portion flat to present straight side cutting edges and having its lower portion curved transversely to present a lower semicircular cutting edge.

2. An implement for thinning corn comprising a blade having its upper portion flat to present straight side cutting edges and having its lower portion curved transversely to present a lower semicircular cutting edge, the side edges of the flat portion of the blade projecting laterally beyond the curved portion of the blade.

In testimony whereof I affix my signature in presence of two witnesses.

HENRY G. HORN.

Witnesses:
R. H. JORDAN,
W. H. HORN.